J. C. PHILBROOK.
Bag Holder.
No. 36,023. Patented July 29, 1862.
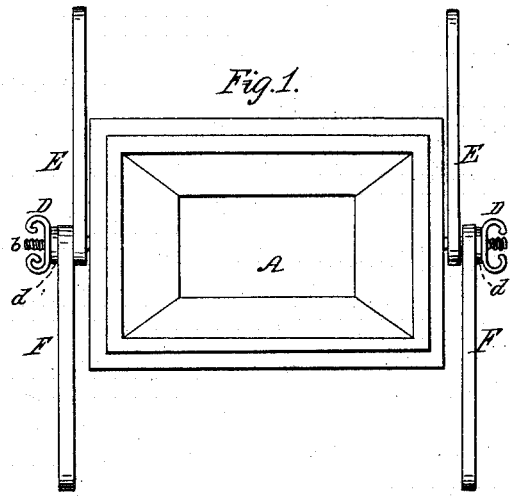
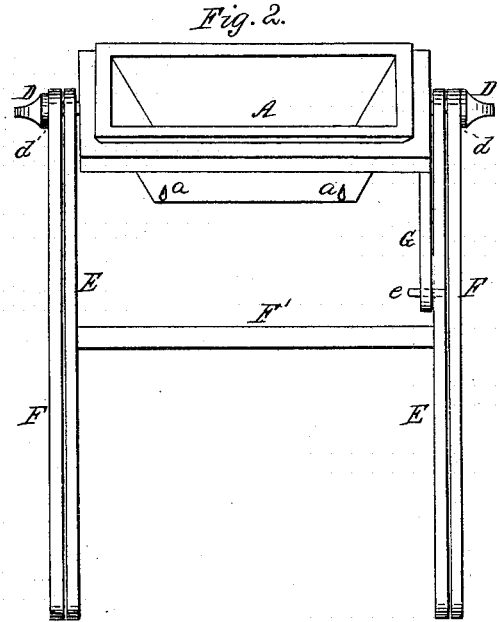
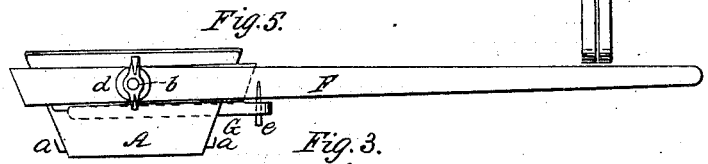
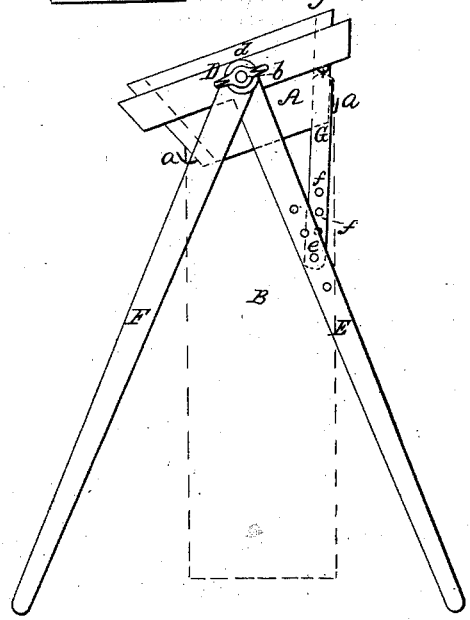
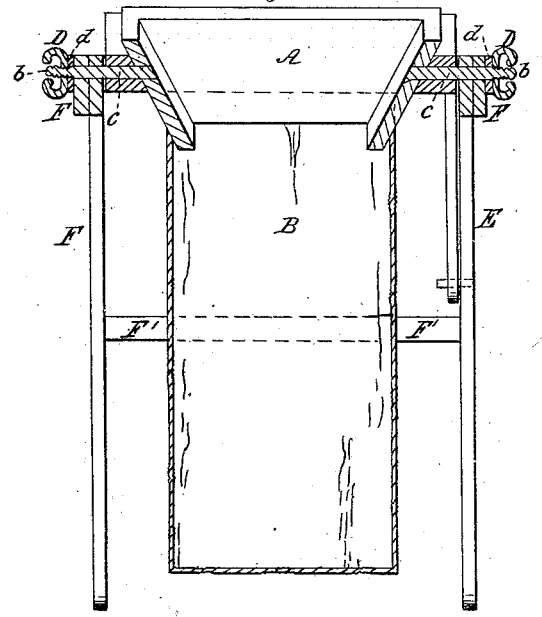
Witnesses:
Inventor:

UNITED STATES PATENT OFFICE.

JOSIAH C. PHILBROOK, OF EAST SANBORNTON, NEW HAMPSHIRE.

IMPROVEMENT IN APPARATUS FOR FILLING SACKS WITH FLOUR.

Specification forming part of Letters Patent No. 36,023, dated July 29, 1862.

*To all whom it may concern:*

Be it known that I, JOSIAH C. PHILBROOK, a citizen of the United States of America, and a resident of East Sanbornton, in the county of Belknap and State of New Hampshire, have invented a new and useful Machine or Apparatus to Facilitate the Introduction of Grain or Flour into Sacks or Bags; and I do hereby declare the same to be fully described and represented in the following specification and the accompanying drawings, of which—

Figure 1 is a top view, Fig. 2 a front elevation, Fig. 3 an end elevation, and Fig. 4 a longitudinal section, of it as it appears when unfolded, and with a bag or sack appended to it. Fig. 5 represents it in a folded state.

This apparatus is so constructed as to enable it to be reduced or folded into a compact form when not in use, in order that it may be portable and easily transported from place to place. It is especially advantageous to farmers and millers, and consists as follows:

A in the drawings is a pyramidal hopper having a series of hooks, $a\ a$, extended from the lower part of its external surface and so as to enable a bag, B, to be hitched upon them in such manner as to depend from the hopper, and with the latter to open into the mouth of the bag. A pin or journal, C, is extended from each end of the hopper, and is provided with a screw, $b$, on which a clamp-nut, D, is screwed. On each of the said journals two legs, E E, are placed in such manner that the journal shall pass through the upper part of them. Between them and the clamp-nut is a washer, $d$, through which the journal passes. The two innermost legs E E are joined by a horizontal or connection bar, F', and one of them is provided with one or more holes to receive a pin, $e$, which is to pass through the same and one of a series of holes, $f\ f$, made in a bar, G, which is hinged to the hopper and depends therefrom, as shown in the drawings.

After the two legs of each journal may have been moved apart and duly placed on the ground or a floor, the hopper may be adjusted so as to stand either horizontally or at such an inclination with the horizon as convenience may require, after which the screw-clamp nuts may be screwed up toward the legs, so as to clamp them tightly to the hopper, which having been done, the strut or bar F' may be pinned to one of the legs and will serve to maintain the hopper in position.

The above mode of making an apparatus for supporting a bag and facilitating the filling it with grain, flour, or any other material not only enables the hopper to be set or adjusted to any desirable inclination, but also admits of the legs being adjusted to an uneven ground or floor, so as to give firmness or stability to the whole structure when in use. When not in use, its parts may be folded or packed together in a very small compass.

In using the apparatus the material to be supplied to the bag is to be poured or thrown into the mouth of the hopper, from whence it will descend into the bag, when appended to the hopper, in manner as hereinbefore described.

Having described my invention, what I claim is as follows:

The said portable folding bag supporting and filling apparatus, consisting of the hopper and two sets of legs as arranged and applied in manner and so as to operate together, and for the purpose substantially as hereinbefore specified.

JOSIAH C. PHILBROOK.

Witnesses:
 AMOS H. JONES,
 JOSHUA A. ROBINSON.